United States Patent [19]

Williams

[11] 4,092,691
[45] May 30, 1978

[54] PROTECTIVE RELAY ARRANGEMENTS

[75] Inventor: Anthony Williams, Newport, England

[73] Assignee: The General Electric Company Limited, London, England

[21] Appl. No.: 740,369

[22] Filed: Nov. 10, 1976

[30] Foreign Application Priority Data

Nov. 14, 1975 United Kingdom ............... 47083/75

[51] Int. Cl.² ............................................ H02H 3/38
[52] U.S. Cl. ...................................... 361/80; 361/67; 361/110
[58] Field of Search ...................... 361/81, 80, 79, 88, 361/78, 84, 67, 68, 110

[56] References Cited

U.S. PATENT DOCUMENTS

| | | | |
|---|---|---|---|
| 2,845,581 | 7/1958 | Hodges et al. | 361/80 |
| 3,938,007 | 2/1976 | Boñiger et al. | 361/80 |

*Primary Examiner*—Patrick R. Salce
*Attorney, Agent, or Firm*—Kirchstein, Kirchstein, Ottinger, Frank & Cobrin

[57] ABSTRACT

A starting relay for a power transmission line protection system.

Where long line sections have to be protected, confusion can arise between normal heavy loads and distant faults having comparable line impedance. The invention provides a starting relay which limits operation of the normal distance relay to conditions within the starting relay characteristic, this being derived by phase and amplitude monitoring of the load at the relay station. The characteristic accepts heavier line currents at potentially normal phase angles than at abnormal phase angles.

Certain unbalanced faults do however exhibit normal phase angles and these are detected by substantial line voltage drops. A described combination of phase, current and voltage detectors thus covers substantially all faults.

The starting relay finds particular application in a carrier-blocking fault detection scheme employing duplicates of the basic characteristic.

7 Claims, 8 Drawing Figures

PROTECTIVE RELAY ARRANGEMENTS

This invention relates to protective relay arrangements for power transmission systems.

It is common practice in such systems to use a distance relay, so-called, which responds to the voltage and current at a relay position on a power transmission line so as to operate, i.e. trip, on the occurrence of a fault within a predetermined distance from the relay position. The distance relay can be made directional so that the protected length of line lies wholly on one side of the relay position. Faults are distinguished from normal load conditions by means of a comparison between the voltage and current at the relay position. The relay is set to operate at a predetermined ratio of current to voltage which if exceeded, indicates a load impedance less than a predetermined value.

A sufficient length of the line will have this impedance value, so that if a lower impedance value is detected — by the operation of the relay — it should be clear that a fault exists within that predetermined length. This length is therefore referred to as the 'reach' of the relay.

A MHO relay is such a directional relay and its operation and application are explained further, in, for example, "Protective Relays Application Guide" second edition, published by GEC Measurements Ltd., 1975.

For very long transmission lines, where the protected length between successive switching stations is very great, distant faults near the extent of the relay's 'reach' will present high line impedances comparable to those of normal heavy loads. Operation of the relay to distinguish faults from normal conditions may then become uncertain, especially as there is usually a significant tolerance on the operating conditions of the relay.

It has therefore been proposed to employ a relay, referred to as a starting or blinder relay, which does not respond to normal load conditions and which can be used to inhibit any protective action that the distance relay may initiate wrongly. Such action would normally be the tripping of a circuit breaker at the associated switching station to isolate the protected section of line. Unnecessary tripping of a circuit breaker might therefore unduly load any parallel lines and is clearly to be avoided if possible.

One object of the present invention is to provide a starting relay arrangement which is particularly suitable for use in the above circumstances.

According to the present invention therefore, a starting relay arrangement for use in a power transmission protection system includes means for detecting unbalanced faults, comprising phase detection means for detecting phase angles, in excess of a predetermined value, between associated line voltages and currents, voltage detection means for detecting the presence of any line-to-line voltage of a low value which is incompatible with a voltage/current phase angle for those two lines in excess of said predetermined value, and fault output means independently operable by said phase detection means and said voltage detection means.

The range of phase angle referred to above is considered to be from zero to ± 90° whether power is transmitted from the relay location to the line or is received at the relay location from the line. There is of course an inherent phase reversal between these two conditions as far as measuring instruments are concerned.

Even though the phase angle of the load current may greatly exceed normal values or the inter-line voltage fall to an extremely low value, it is undesirable that very low values of current should be allowed to operate the starting relay, which preferably, therefore, includes means for enabling the fault output means only in response to a difference of line current magnitude between any two lines in excess of a predetermined minimum value.

The arrangement may include means responsive to a difference of line current magnitudes in excess of a predetermined maximum value to operate the fault output means.

Preferably, the means responsive to a difference of line current magnitudes is responsive to the currents of only two particular lines, for the operation of said fault output means in the presence of balanced faults.

Distance relays may be employed at each end of a protected line section, looking inwardly, and each having a reach of approximately 80% of the section. In this way, it can be ensured that neither relay over-reaches the section, that is, responds to a fault outside the section, at least in a first time zone. At the same time each relay covers the 20% portion by which the other relay falls short. Detection of a fault by either relay then causes circuit breakers at both ends to trip, thus isolating the faulty section completely.

In such a case signalling between the ends is necessary. The signalling may be of two kinds, permissive or blocking. In permissive signalling a signal is transmitted to the remote end when a distance relay detects a fault. Only when the signal is received is the associated circuit breaker permitted to trip. A disadvantage of this system is that the signal has to be transmitted through the fault and this may be difficult if the signalling is impressed on the line itself. In the blocking system a signal is transmitted permanently and ceases only when a fault is detected. Reception of the signal inhibits any tripping action initiated by the remote distance relay. This is clearly a more foolproof system but continuous transmission is sometimes objectionable.

According to one application of the present invention therefore, a carrier-blocking distance scheme for a power transmission protection system includes a distance relay at a relay station at each end of a line section to be protected, each distance relay being inherently responsive to faults occurring between the position of the relay and a remote point beyond the position of the other distance relay to effect protective action, and a starting relay arrangement as aforesaid, associated with each distance relay, each starting relay arrangement having an operating characteristic, hereinafter designated a tripping characteristic defining the operating conditions of said fault output means, operation of the associated distance relay being limited to fault conditions within the tripping characteristic which is set to define a reach greater than said line section, each starting relay arrangement also exhibiting a further, blocking, characteristic which duplicates the tripping characteristic and is associated with transmitting means to cause transmission of a blocking signal in the event of a fault condition occurring within the blocking characteristic, the reception of a blocking signal at a said relay station being effective to inhibit any protective action that would otherwise be taken by the distance relay at that relay station, and each distance relay being operative, on detection of a fault thereby, to inhibit the local transmitting means, so that each distance relay is prevented from initiating protective action in repsonse to a fault beyond the protected section but within its reach by a blocking signal transmitted from the remote relay station during the existence of such a fault.

Preferably, the blocking characteristic defines a greater reach than does the tripping characteristic so that, in the event of a fault outside the protected line section, the forward reach of the remote tripping characteristic falls short of the backward reach of the near blocking characteristic thus ensuring that protective action by the remote distance relay is prevented.

According to another aspect of the invention, it may be seen to consist in a relay assembly for use in a carrier blocking distance scheme and comprising a starting relay arrangement with tripping and blocking characteristics as aforesaid, a directional distance relay and transmitting and receiving means, all being constructed and arranged for use with the above distance scheme.

It sometimes occurs that power swings of great magnitude occur as a result, for example, of switching a large load on to the system. Such power swings can constitute a large power flow through the protected section such that if it persisted would be a fault condition. Power swings usually, however, correct themselves, if the system remains stable, the load condition swinging into the operating area of the starting relay characteristic and back out again.

According to a feature of the invention therefore, the starting relay arrangement, having both tripping and blocking characteristics, may include timing means responsive to the time delay between the occurrence of fault indications arising from movement of a load condition into the operating areas of the blocking and the tripping characteristics respectively, a time delay in excess of a predetermined amount causing any circuit-tripping protective action to be inhibited, low frequency power swings through fault conditions being thereby distinguishable from persistent faults.

A starting relay arrangement in accordance with the invention will now be described, by way of example, with reference to the accompanying drawings, of which:

Figure 8:
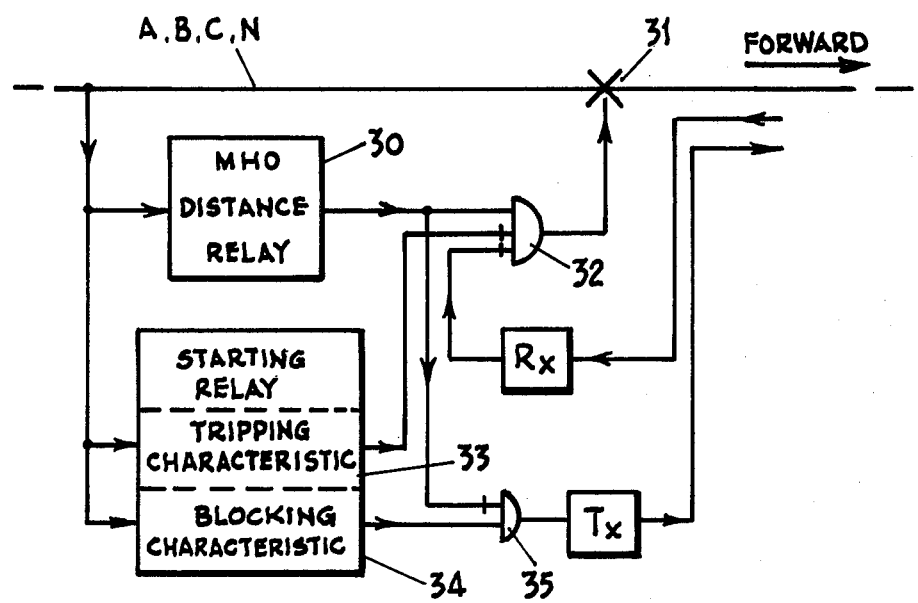

and FIG. 8 is a block schematic representation of a relay station in a carrier-blocking distance scheme.

Figure 1:
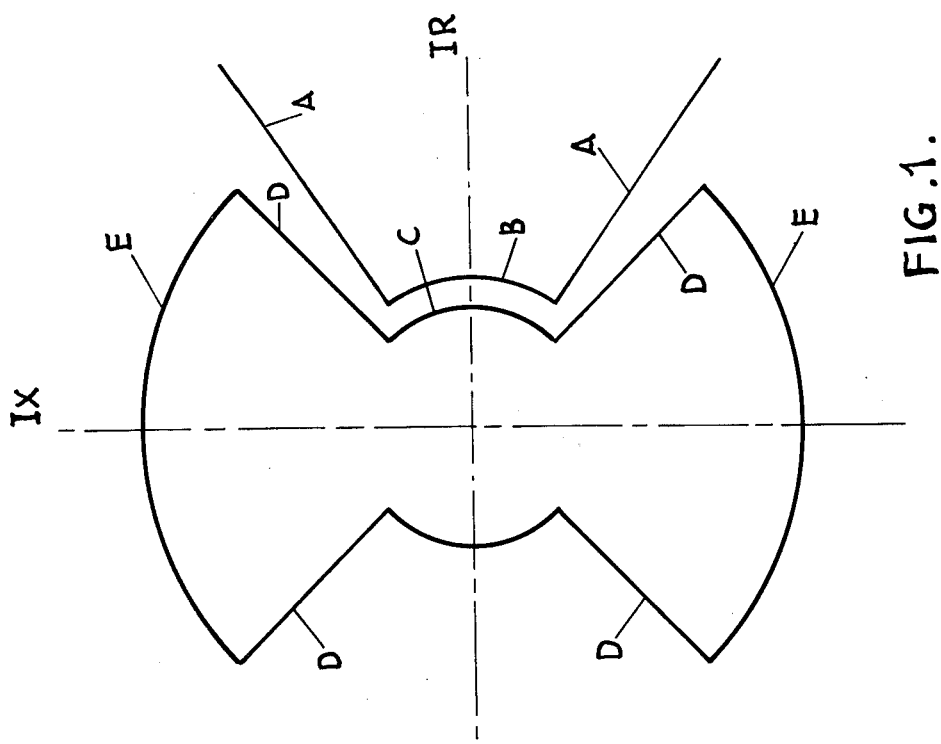
FIG. 1 shows the basic operating characteristic of the starting relay.

Referring to FIG. 1 of the drawings, this shows the desired starting characteristic. The diagram is shown with axes of IX and IR so that any point on it represents a voltage vector, as measured at the relay line position, with respect to the load (or fault) current phase at the same position. The current is of course aligned in phase with the resistive voltage component and thus lies along the IR axis. The diagram is thus drawn for a fixed reference current value so that as the load increases, i.e. as the impedance decreases, the voltage vector retreats towards the centre.

The characteristic is, subject to requirements of a carrier blocking scheme, to be explained, non-directional, that is, the starting relay responds equally to power transmitted in either direction through the relay position. The characteristic is thus symmetrical about the vertical axis, the right-hand half representing power supplied to the section to be protected and the left-hand half representing power supplied to the section or substation bus bars 'behind' the relay (in different circumstances of course).

The area defined by the radii A and the arc B is the load area for the forward direction and represents all possibilities for one phase of a normal balanced load. The maximum rated load is specified by the arc B and the limits of acceptable power factor by the radii A. The starting relay must not, therefore, operate for any condition within this load area.

In order to avoid the load area, the characteristic of FIG. 1 is made up of two basic portions, an excess load portion C required to skirt the maximum rated load line B by a small margin, and an excess phase angle portion within radii D. These latter radii are set at an angle to the IR axis such as to clear the load area with a small margin, and in this example are set at 45°.

The characteristic is then completed by minimum load portions E which although not essential, are necessary for stability of the relay operation. These portions ensure that a very small load will not give a fault indication no matter how obviously abnormal it is.

Any fault condition that occurs within the area of the operating characteristic will therefore give a fault indication and, typically, will allow the distance relay, also at the relay position, to take effect on detecting a fault within its reach.

The relay characteristic is constructed as follows. The (vertical) sectors, between the radii D, and extending from the origin indefinitely outwards, are provided by two phase comparators known as 'block average comparators'. Such a comparator compares the waveforms of two signals and gives a logical '1' or'0' output according as the waveforms have the same or different polarity. The resulting 'block' waveform is averaged by 'leaky' integration and the average so obtained is level-detected. The level detector will be triggered by a predetermined minimum degree of out-of-phase of the two waveforms.

One such comparator compares a particular phase-to-phase voltage with the difference of current in the same two lines. This comparator is adapted to operate, i.e. trip the level detector, for a phase displacement of at least ± 45°. This provides the 'forward' pair of radii D.

The second comparator compares the same phase-to-phase voltage with the reversed current-difference signal to provide the 'reverse' pair of radii D, responding to phase angles between ± 135° and ± 90° while actually detecting phase angles between ± 45° and ± 90°.

Three such pairs of comparators are employed, one pair for each phase pair.

Thus, for any balanced or unbalanced fault involving a power factor angle of more than ± 45° the starting relay will trip (subject to a minimum load limitation to be explained).

Figure 2:
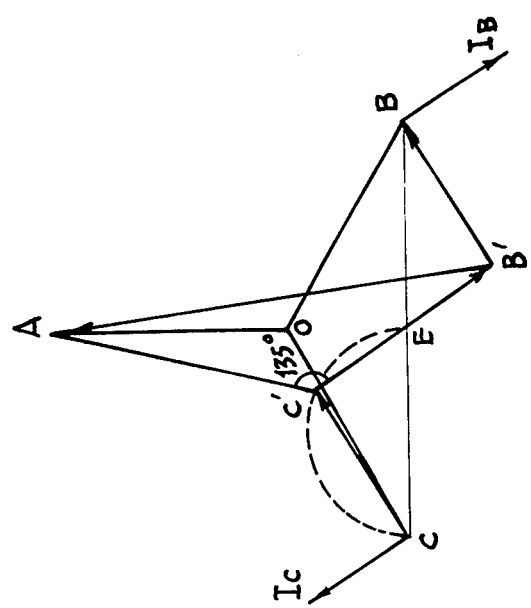
FIG. 2 is a vector diagram for an extreme, unbalanced, fault condition.

Certain unbalanced faults can, however, exhibit normal power factors angles. This is illustrated by FIG. 2 which is a vector diagram representing a resistive fault between B and C phases very close to the relay position (i.e. with zero line impedance) and with a source impedance angle of 90°. This is thus an extreme, and worst, case.

In FIG. 2 the three phase voltages in the absence of a fault are represented by AO, BO and CO. The BC phase-to-phase voltage becomes B' and C' at the relay position in the presence of this extreme fault and this is therefore the fault voltage. The remainder of the generated BC voltage is made up by the source phase impedance volt drops CC' and BB'. With the assumed resistive fault and reactive source, the voltages CC' and B'C' are at right angles. As the fault is symmetrically between the B and C lines the fault voltage vector B'C' bisects the BC vector (at E.). The point C' must therefore have a semicircular locus on CE as diameter the position varying with the fault resistance. The fault current is indicated by the vectors $I_C$ and $I_B$ representing the equal and opposite currents to and from the fault.

It may be seen from this diagram that the comparator comparing the phase A and phase B current and voltage will give no fault indication as the angle between AB' and $I_B$ is less than 45° ($I_A$ is zero). Similarly, the BC phase comparator will give no fault indication (resistive load, exactly in phase). The AC phase comparator will, however, respond to the angle between AC' and $I_C$, that is, between AC' and C'B'. This angle varies between 60° with infinite fault resistance (C' and C coinciding), and 180° with zero fault resistance (C' and E coinciding). Referring to FIG. 1 it is clear that a fault indication will be given by the phase detectors only for that part of this range lying between 60° and 135° (counted from the IR axis), leaving the portion from 135° to 180° un-catered for. However, at 135° the value of the fault voltage B'C' is 53.4% of the normal phase-to-phase voltage BC, and decreases from this figure in the 'unprotected' range.

An under-voltage detector is therefore employed on each pair of phases to give a fault indication if the associated voltage falls below 53.4% of normal rated phase-to-phase voltage.

As mentioned previously, FIG. 2 represents an extreme condition. For partly reactive faults and a source impedance angle of less than 90° the low voltage limit is reduced, that is, the critical angle of 135° occurs at a smaller fault voltage.

Apart from unbalanced faults falling within the above low-fault-voltage class, an unbalanced fault will be detected by one or other of the three phase comparators.

Where the excess load criterion (curve C) is not operative, the characteristic of FIG. 1 does not extend indefinitely outwards into negligibly low load conditions since in such conditions fault indications of voltage or phase are of no consequence. The portions E of the characteristic are therefore provided by minimum current detectors on each pair of phases, which prevent the relay operation anywhere outside the circle of which the portions E are part.

The remaining portion of the relay characteristic, referenced C, is the portion that has to distinguish between normal heavy loads and balanced faults of normal power factor. This is achieved by a current amplitude measuring circuit connected to measure the difference between the currents in a pair of phases. Only one such unit is required since only balanced faults are being considered.

The detection of phase to earth faults, where there is no possibility of confusion with normal load, is achieved by a current amplitude detector set to the same current level as the minimum current detectors (giving portion E of the characteristic) and fed with the sum of the three line currents i.e. the neutral current.

Figure 3:
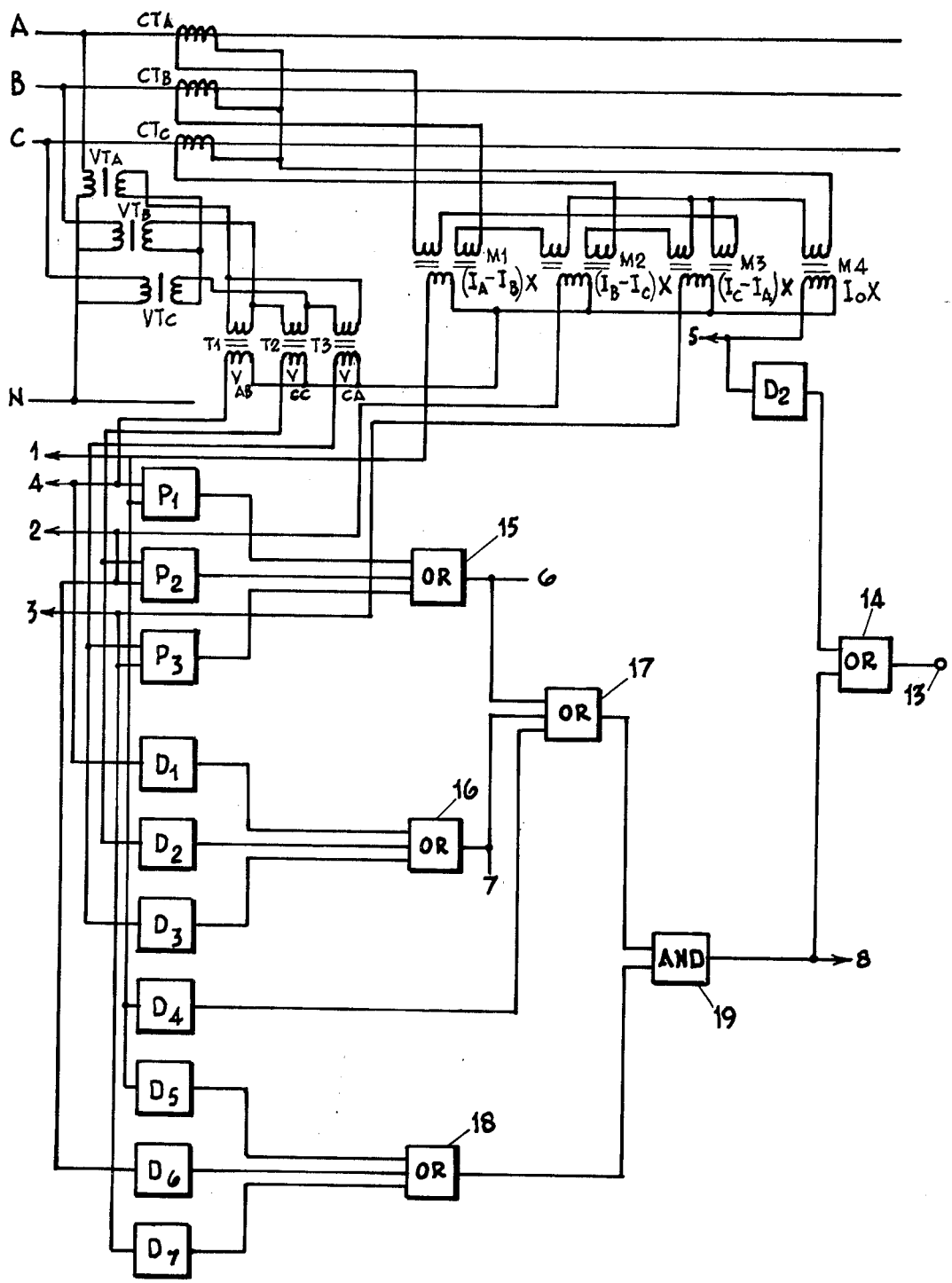
FIG. 3 is a block diagram of the basic starting relay.

Referring now to FIG. 3 this shows, in block form, the circuitry of the starting relay used to provide the operating characteristic of FIG. 1.

The three phase lines at the relay position are referenced A, B and C and the neutral line N. Line voltage transformers $VT_A$, $VT_B$ and $VT_C$ have their star-connected secondary windings connected to the delta connected primary windings of three transformers $T_1$, $T_2$ and $T_3$ so as to derive the phase-to-phase voltages $V_{AB}$, $V_{BC}$ and $V_{CA}$.

Current transformers $CT_A$, $CT_B$ and $CT_C$ are connected to three mutual inductors $M_1$, $M_2$ and $M_3$ each of which has two primary windings and a secondary winding. Each pair of primary windings are connected to two of the current transformers so as to derive the difference of two line currents. The secondary windings thus provide voltages $(I_A - I_B)X$, $(I_B - I_C)X$, and $(I_C - I_A)X$.

A fourth mutual inductor $M_4$ has a single primary winding connected in the neutral line from the current transformers to detect phase to earth currents.

The power factor of a balanced load is given by the phase angle between the current difference of two lines and the phase-to-phase voltage of those two lines. The output voltages of the inductors $M_1$–$M_3$ are therefore compared with the secondary voltages of transformers $T_1$–$T_3$ in respective phase comparators $P_1$, $P_2$ and $P_3$. Each of these comprises a pair of 'block average comparators' previously referred to for detecting faults within the vertical sectors of the relay characteristic of FIG. 1.

The secondary windings of the transformers $T_1$–$T_3$ are also connected to respective level detectors $D_1$–$D_3$ which are triggered to give an output when the inputs, $V_{AB}$, $V_{BC}$ or $V_{CA}$ falls below 53.4% of the rated phase-to-phase voltage. As explained with reference to FIG. 2, these detectors therefore cover those unbalanced faults not picked up by the phase comparators $P_1$–$P_3$.

For the detection of balanced excess current faults, i.e. within the quadrants limited by lines C of the characteristic, a current amplitude detector $D_4$ is employed. As explained previously, this is required on only one phase pair and is here connected to the secondary of mutual inductor $M_1$, thus responding to the difference of currents $I_A$ and $I_B$.

Finally, three minimum current detectors $D_5$, $D_6$ and $D_7$ are connected to the three mutual inductor secondary windings and are each set to give an output when the associated current difference exceeds a predetermined fraction of the rated load current. These detectors provide the limited circle E of the relay characteristic.

The outputs of the various comparators are employed as follows. The neutral current inductor $M_4$ has its secondary connected to a current detector $D_8$ set to the same low level as $D_5$–$D_7$. Any neutral current in excess of this level is a positive indication of a fault and the detector $D_8$ applies an output signal to a final fault output terminal 13 by way of an OR gate 14. If required, the output of $D_8$ may be used to provide a separate signal to indicate earth faults.

Apart from such earth faults, a combination of conditions is necessary before a final fault indication is given. If any one of the comparators $P_1$, $P_2$ or $P_3$ or any of the detectors $D_1$–$D_4$ give an output at the same time as any of the minimum current detectors $D_5$–$D_7$ give an output, then a final fault indication at terminal 13 is given.

To this end, the phase comparators $P_1$–$P_3$ are connected to an OR gate 15, the detectors $D_1$–$D_3$ to an OR-gate 16, and these two OR-gates together with detector $D_4$ are connected to a further OR-gate 17. The detectors $D_5$–$D_7$ are connected to an OR-gate 18 and the outputs of gates 17 and 18 are combined in an AND-gate 19 for supply to the terminal 13 by way of OR-gate 14.

The tapping points referenced 1–8 will be explained with reference to FIGS. 6 and 7.

As so far described, the starting relay of FIG. 3, with the characteristic of FIG. 1, will detect all balanced and unbalanced faults outside the normal load area.

The application of the invention to a carrier blocking distance scheme will now be described. For this purpose a duplicate blocking characteristic is employed which completely surrounds the tripping characteristic, as shown in FIG. 5.

The relay station at one end of a protected line section is shown diagrammatically in FIG. 8.

In use in a carrier-blocking distance scheme, a MHO directional distance relay is employed at each end of the section of line to be protected, the 'reach' of this relay extending beyond the other relay station. In FIG. 8 the distance relay 30 is shown as operating a circuit breaker 31 by way of a gate 32. A MHO relay has a characteristic which, in the circumstances for which the invention is particularly suited, would operate falsely in certain heavy, although normal, load conditions. The inner, or 'tripping' characteristic of FIG. 5 is used to prevent such false operation, thus being shown as an inhibit input to gate 32 in FIG. 8, thus allowing operation of the distance relay only for conditions within the designated area of the characteristic. The circuitry providing this 'high-set' tripping characteristic has been described with reference to FIG. 3.

Figure 5:
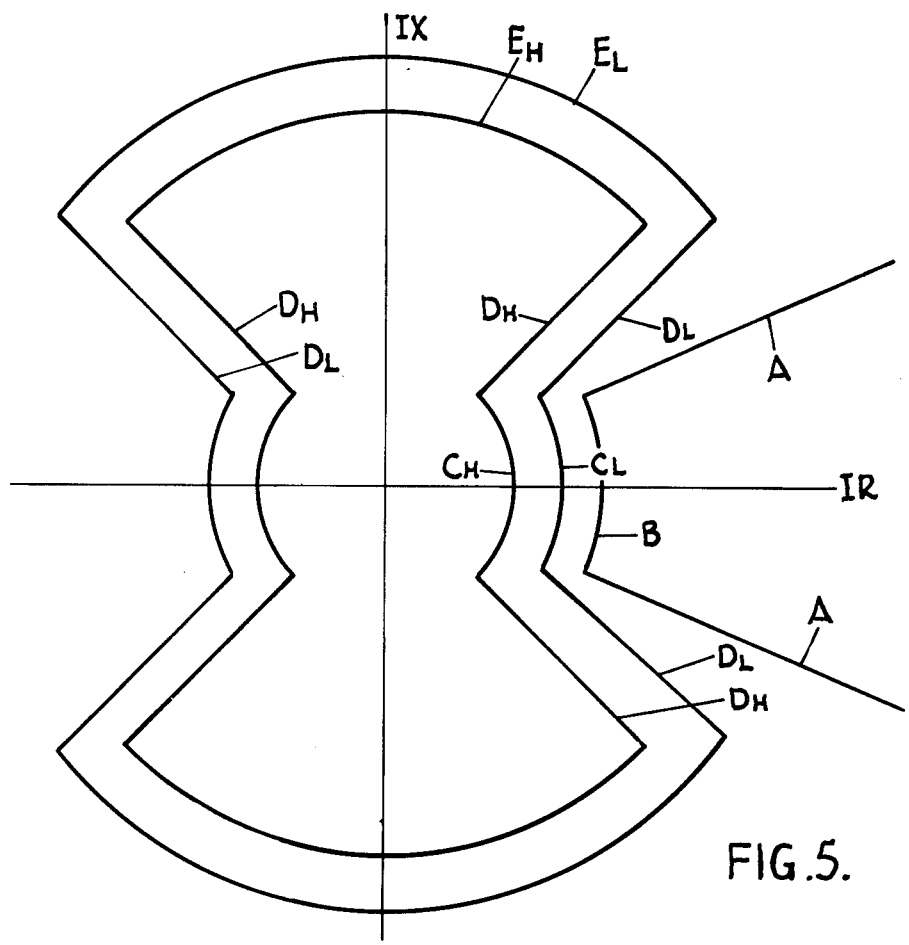
FIG. 5 shows high-set and low-set tripping and blocking operating characteristics for the starting relay.

In addition to the distance relay 30 and high-set starter 33 at each relay station, there is a low-set starter 34 having the outer characteristic of FIG. 5 to provide a blocking function. A carrier signal transmitter $Tx$ at each station is triggered by operation of the low-set blocking starter to transmit a blocking signal to a receiver at the other station. This is shown as being by way of a gate 35. Reception of a blocking signal by a receiver $Rx$ is used to inhibit, as represented by the gate 32, any protective action (tripping the local circuit breaker 31) that would otherwise result from operation of the distance relay. Operation of the distance relay 30 will, however, disable the associated transmitter $Tx$ by way of the gate 35 and prevent transmission of a blocking signal.

Considering first a fault within the section, both blocking starters 34 (the outer characteristic of FIG. 5) will detect it and will trigger their associated transmitters $Tx$ to transmit a blocking signal to the other relay station. Protective action by the distance relays would therefore be inhibited but the distance relays will themselves have detected the fault (it being in the 'forward' direction for both of them) and consequently suppressed the blocking signals. Protective action then follows.

Where a fault occurs outside the protected section but within the reach of the remote distance relay, both blocking starters 34, being largely non-directional, will again detect the fault and initiate blocking signals. The distance relay 30 nearer the fault will not detect it and will not therefore suppress the associated transmitter. Neither will it, of course, initiate any protective action. The remote distance relay will detect the fault and will consequently suppress its own transmitter. It will not, however, be able to initiate any protective action as that relay station is still receiving a blocking signal.

The position is then that the near relay station effects no protective action because its distance relay does not see the fault, and the far station effects no action because it is blocked by the signal transmitted by the near station.

It may be seen that the system makes an advantage of the possibility of the fault preventing transmission of the blocking signal, because only faults within the protected section can prevent signal transmission between the two stations and the only effect of suppression of the blocking signal is to permit protective action to take place.

With regard to the double characteristic of FIG. 5, although the relays at the two stations will be similar, the important relation between the two characteristics is between the blocking characteristic at one end and the tripping characteristic at the other. The two characteristics of FIG. 5 therefore relate to opposite ends of the protected section. The reason for the enclosure of one characteristic by the other is as follows. In the above case of a fault outside the protected section if this is detected by the remote distance relay then it is essential that it is also detected by the near blocking starter in order that the remote distance relay is prevented from tripping the line circuit breaker when there is no fault in the section.

The 'reach' of the blocking starter must therefore be greater than that of the tripping starter. Since the line impedance determines the reach, and the voltage vector of the characteristic increases with the impedance (at the fixed reference current), then the size of the characteristic increases with the reach. There is of course an inherent margin of safety in the length of the protected section, which effectively reduces the reach of the tripping starter. The difference in the characteristic does however ensure correct operation in this respect.

The characteristics of FIG. 5 strictly speaking have a forward direction which is obliquely through the first quadrant since the MHO relay itself has a directional characteristic biased in this direction.

It will be apparent from the above that the significant direction for the low set blocking characteristic is the backward direction to ensure that a blocking signal is transmitted if there is any chance of the remote tripping characteristic detecting a fault outside the section. It follows therefore that the blocking characteristic can have a directional component, and thus be more sensitive, i.e. set 'lower', in the backward direction, i.e. the third quadrant and parts of the second and fourth.

Figure 4:
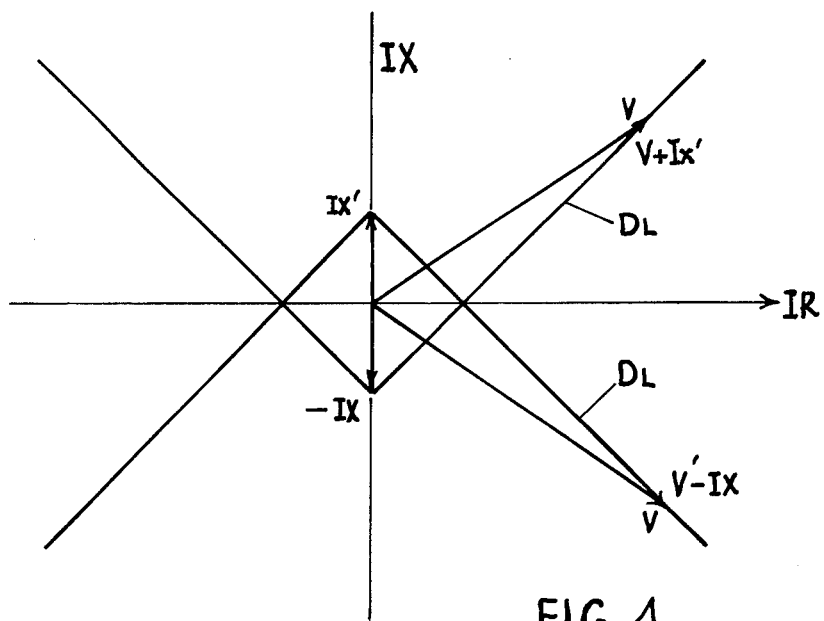
FIG. 4 is an impedance diagram illustrating load power factor angle for a low-set relay characteristic.

The blocking characteristic which is essential to this distance scheme is derived as will be explained with reference to FIGS. 4 and 6. The 'radii' $D_L$ in FIG. 5 are obtained by two phase comparators as for the basic characteristic but in this case the upper and lower sectors are displaced through the origin, as shown in FIG. 4, by the subtraction and addition of a bias voltage $IX'$. The effect is to displace the significant portion $D_L$ of the characteristic laterally. The two phase comparators operating on phases A and B are shown in FIG. 6 ($P_4$ and $P_5$).

The under voltage detector $D_9$ is set to a value slightly above the voltage setting of the corresponding detector $D_1$ of FIG. 3. Level detector $D_{10}$ determines the portion $D_L$ of the low-set characteristic and is set to operate at a current greater than the maximum load current (B) but less than the operating level of detector $D_4$.

Level detectors $D_{11}$, $D_{12}$ and $D_{13}$ are set to minimum current levels slightly lower than the settings of detectors $D_5$, $D_6$ and $D_7$.

Neutral current detector $D_{14}$ is set to operate at a level of neutral current less than the current setting of detector $D_8$.

If user settings are employed for the load current and under-voltage measurements it is essential that the under-voltage setting must not be below 53.4% and it is desirable that the offsets applied to the phase comparison circuits of the low set device be linked to these settings. This is to ensure that the lowest angle seen by the device for currents less than load and voltages greater than the undervoltage setting is not affected by altering the load current or undervoltage settings.

Thus in all respects the blocking characteristic is low-set and will detect any fault that the high-set characteristic will detect. It is thus ensured that the blocking signal is always present before the distance relay makes a fault distance measurement. The benefits of a blocking carrier system are thus obtained without the disadvantage of continuous carrier transmission.

Figure 6:
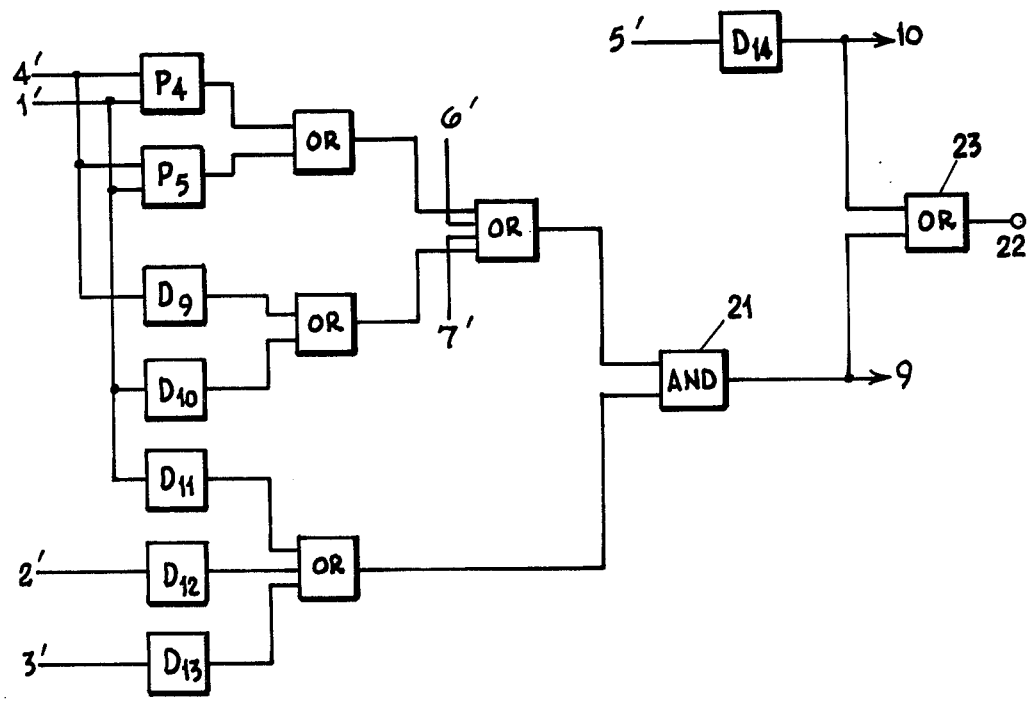
FIG. 6 is a block diagram of circuitry used to provide the low-set characteristic.

In FIG. 6, the terminals 1' to 7' are connected to the corresponding terminals in FIG. 3.

A final neutral current fault indication is provided at terminal 10 and a final fault indication for any other kind of fault is provided at terminal 9 by way of an AND-gate 21. These two fault indications are provided at a common output terminal 22 by way of an OR-gate 23.

There is one particular circumstance in which a load condition appears within the starting relay characteristic but which is not a fault. This occurs in the case of power swings after a sudden heavy change of load due perhaps to disconnection of lines for protective reasons or to sudden connection of heavy loads. In such cases the phase angle between power systems at each end of the line will change to accommodate the new load conditions and will oscillate slowly before stabilising. Such oscillation can cause the load operating point to drift into the relay characteristic. However, no protective action is required since the situation is normally self-correcting and the load point will drift out again.

Power swings can be distinguished from 'real' faults by the rate at which the load point moves. The double characteristic of FIG. 5 has been found to lead itself readily to the measurement of this rate of change.

Figure 7:
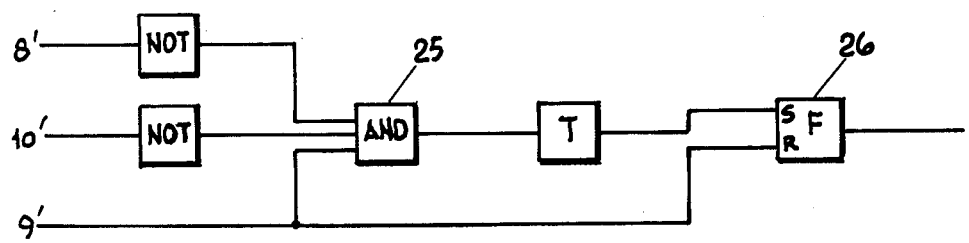
FIG. 7 is a block diagram of circuitry for distinguishing power swings from genuine faults.

Referring to FIG. 7, this circuit distinguishes between load changes which pass rapidly and slowly between the low set and the high-set characteristics.

One input 8' is derived from the high-set output terminal 8 of FIG. 3. A second input 10' is derived from the low-set earth-fault detector terminal 10 of FIG. 6, and a third input 9' is derived from the low-set output terminal 9 of FIG. 6. Thus, as a fault condition passes through the double characteristic, a first fault indication appears at terminal 9 and then, with a delay according to the rate of drift of load point, at terminal 8. If the load condition is in fact an earth fault, it could not be the result of a power swing and the test is disabled by the input at terminal 10'. In other cases the AND-gate 25 will be enabled and will produce an output pulse for the period between the detection of the fault by the two characteristics. A power-swing indicating bistable element 26 will initially be reset by the low-set input and will only be set, to indicate a power swing, if the pulse output of the AND-gate 25 outlasts a predetermined time delay imposed by a delay circuit T. Thus a slow change of load point will set the bistable 26 but a rapid change, in a real fault condition, will not.

The bistable element 26, when set, blocks the protection scheme. When the low set starter relay resets, the bistable element is also reset so removing the blocking signal.

In one particular modification of the circuit of the starting relay, the phase comparators $P_1$ etc. may be constructed in a different manner. From the current difference signals $(I_A - I_B)X$ etc. two other signals are derived leading and lagging the original signal by 45°. Points on the waveform of these two signals and of the voltage signal, e.g. a positive going zero transition, are compared in a sequence detector. If the voltage signal is second then the load point is within the vertical sector (FIG. 1).

The characteristics of FIGS. 1 and 5 have been described as having ± 45° sectors. This is a convenient value but it is not essential. It is only necessary that the operating sectors of the characteristic skirt the load area.

I claim:

1. A starting relay arrangement for use in a power transmission protection system, and including means for detecting unbalanced faults, comprising phase detection means for detecting phase angles, in excess of a predetermined value, between associated line voltages and currents, voltage detection means responsive to line-to-line voltages below a threshold value, said threshhold value being the minimum value of any line-to-line voltage at which a phase angle in excess of said predetermined value can be detected, and fault output means independently operable by said phase detection means and said voltage detection means.

2. A relay arrangement according to claim 1, including means for enabling said fault output means only in response to a difference of line current magnitude between any two lines in excess of a predetermined minimum value.

3. A relay arrangement according to claim 1, and including means responsive to a difference of line current magnitudes in excess of a predetermined maximum value to operate said fault output means.

4. A relay arrangement according to claim 3, wherein said means responsive to a difference of line current magnitudes is responsive to the currents of only two particular lines, for the operation of said fault output means in the presence of balanced faults.

5. A carrier-blocking distance scheme for a power transmission protection system and including a line section to be protected, a relay station at each end of said line section, each relay station including a distance relay which is inherently responsive to faults occurring between the position of the relay and a remote point beyond the position of the other distance relay to effect protective action, and a starting relay arrangement according to claim 1, associated with each distance relay, each starting relay arrangement having an operating characteristic, hereinafter designated a tripping characteristic, defining the operating conditions of said fault output means, operation of the associated distance relay being limited to fault conditions within the tripping characteristic which is set to define a reach greater than said line section, each starting relay arrangement also exhibiting a further, blocking, characteristic which duplicates the tripping characteristic, each relay station further including transmitting means and receiving means for the transmission of blocking signals between relay stations, said blocking characteristic being associated with transmitting means to cause transmission of a blocking signal in the event of a fault condition occurring within the blocking characteristic, the reception of a blocking signal at a said relay station being effective to inhibit any protective action that would otherwise be taken by the distance relay at that relay station, and each distance relay being operative, on detection of a fault thereby, to inhibit the local transmitting means, so that each distance relay is prevented from initiating protective action in response to a fault beyond the protected section but within its reach by a blocking signal transmitted from the remote relay station during the existence of such a fault.

6. In a carrier blocking distance scheme according to claim 5, a starting relay arrangement including timing means responsive to the time delay between the occurrence of fault indications arising from movement of a load condition into the operating areas of said blocking and said tripping characteristics respectively, a said time delay in excess of a predetermined amount causing any circuit-tripping protective action to be inhibited, low frequency power swings through fault conditions being thereby distinguishable from persistent faults.

7. A carrier-blocking distance scheme according to claim 5, wherein at least in a direction away from the remote relay station, said blocking characteristic defines a greater reach than does said tripping characteristic so that, in the event of a fault outside the protected line section, the forward reach of the remote tripping characteristic falls short of the backward reach of the near blocking characteristic thus ensuring that protective action by the remote distance relay is prevented.

* * * * *